US012778830B2

(12) United States Patent
Davis

(10) Patent No.: US 12,778,830 B2
(45) Date of Patent: Nov. 3, 2026

(54) METHOD AND SYSTEM FOR ASSESSING LEG MUSCLE CONDITION

(71) Applicant: James Michael Davis, Carbondale, IL (US)

(72) Inventor: James Michael Davis, Carbondale, IL (US)

( * ) Notice: Subject to any disclaimer, the term of this patent is extended or adjusted under 35 U.S.C. 154(b) by 697 days.

(21) Appl. No.: 18/114,338

(22) Filed: Feb. 27, 2023

(65) Prior Publication Data

US 2024/0245568 A1 Jul. 25, 2024

Related U.S. Application Data

(60) Provisional application No. 63/441,072, filed on Jan. 25, 2023.

(51) Int. Cl.

| | |
|---|---|
| ***A61H 1/02*** | (2006.01) |
| *A61H 3/00* | (2006.01) |
| *A63B 23/00* | (2006.01) |
| *A63B 23/035* | (2006.01) |
| *B25J 9/00* | (2006.01) |

(52) U.S. Cl.

CPC ............. *A61H 1/0237* (2013.01); *A61H 1/02* (2013.01); *A61H 2003/001* (2013.01); *A61H 2201/1642* (2013.01); *A61H 2201/5064* (2013.01); *A61H 2203/0406* (2013.01); *A63B 23/00* (2013.01); *A63B 23/035* (2013.01); *B25J 9/00* (2013.01)

(58) Field of Classification Search

CPC ............ A61H 1/024; A61H 2201/5064; A61H 1/0266; A63B 21/00; B25J 9/00

See application file for complete search history.

(56) References Cited

U.S. PATENT DOCUMENTS

D347,869 S * 6/1994 Friend .......................... D21/685
7,169,098 B1 * 1/2007 McGanty ............. A61H 1/0237 482/79
D751,719 S * 3/2016 Davis ........................... D24/188
9,446,288 B1 * 9/2016 Pazan ...................... A61H 1/02

(Continued)

FOREIGN PATENT DOCUMENTS

CA 2606393 A1 * 11/2006 ......... A63B 69/3667
CN 114534203 A * 5/2022 ......... A63B 71/0622

(Continued)

OTHER PUBLICATIONS

XSENSOR: https://web.archive.org/web/20221126124558/https://www.xsensor.com/solutions-and-platform/human-performance/walkways-stance-pads (Year: 2022).*

(Continued)

*Primary Examiner* — Brandy S Lee
*Assistant Examiner* — Aislinn M Jones
(74) *Attorney, Agent, or Firm* — Tod Kupstas

(57) ABSTRACT

A stretching device that is used to provide therapy to leg muscles of a person. The stretching device also assesses the status of leg muscles, such as the triceps surae muscles. Distance sensors are located at specific locations on the stretching device and provide data regarding the position of the back of a user's knee and the distance of the heel of the foot from the surface of a stand portion of the stretching device. Measurements are taken over a period of time and are transmitted to a location where the data can be stored and used for further analysis.

15 Claims, 7 Drawing Sheets

(56) References Cited

U.S. PATENT DOCUMENTS

| | | | | |
|---|---|---|---|---|
| 10,549,142 | B1 * | 2/2020 | Ash | A61H 1/0266 |
| 11,154,221 | B2 * | 10/2021 | Bastide | A63B 24/0062 |
| 2006/0240955 | A1 * | 10/2006 | Pu | A61H 1/0266 482/79 |
| 2007/0184952 | A1 * | 8/2007 | Matsubara | A63B 21/00178 482/148 |
| 2008/0119337 | A1 * | 5/2008 | Wilkins | A63B 5/00 482/130 |
| 2010/0279835 | A1 * | 11/2010 | Ozawa | A63B 21/068 482/148 |
| 2015/0328497 | A1 * | 11/2015 | Doucot | A63B 69/0057 482/146 |
| 2016/0151228 | A1 * | 6/2016 | Fujikake | A61F 2/70 623/28 |
| 2016/0171904 | A1 * | 6/2016 | Almarales | A63B 21/00047 434/250 |
| 2016/0296794 | A1 * | 10/2016 | Land | A63B 23/04 |
| 2017/0172331 | A1 * | 6/2017 | Publicover | B32B 7/022 |
| 2018/0296879 | A1 * | 10/2018 | Blium | A63B 21/0615 |
| 2019/0108391 | A1 * | 4/2019 | Matsuzawa | G06V 40/25 |
| 2019/0290168 | A1 * | 9/2019 | Bastide | G16H 40/63 |
| 2019/0344112 | A1 * | 11/2019 | Phillips | A63B 22/04 |
| 2020/0221975 | A1 * | 7/2020 | Basta | A63B 24/0075 |
| 2020/0324164 | A1 * | 10/2020 | Amis | A61H 1/0237 |
| 2021/0378903 | A1 * | 12/2021 | Mooney | A61H 3/00 |
| 2022/0047922 | A1 * | 2/2022 | Shintani | A63B 24/0062 |
| 2022/0117822 | A1 * | 4/2022 | Rembao | A61H 1/0266 |
| 2022/0143467 | A1 * | 5/2022 | Green | A63B 24/0087 |
| 2022/0313546 | A1 * | 10/2022 | Spencer | A61H 23/02 |
| 2022/0392370 | A1 * | 12/2022 | Kweon | G09B 5/06 |

FOREIGN PATENT DOCUMENTS

| | | | | | |
|---|---|---|---|---|---|
| DE | 10309567 | A1 | * | 9/2004 | G01G 19/44 |
| EP | 1454584 | A1 | * | 9/2004 | G01G 19/44 |
| EP | 4123423 | A1 | * | 1/2023 | A63B 24/0062 |
| GB | 2367763 | A | * | 4/2002 | A63B 23/08 |
| GB | 2592925 | A | * | 9/2021 | A61H 1/0237 |
| KR | 20110002065 | A | * | 1/2011 | A61H 1/0262 |
| KR | 20210060106 | A | * | 5/2021 | B25J 19/021 |
| KR | 20230135208 | A | * | 9/2023 | A61H 1/0237 |
| WO | WO-2006103676 | A2 | * | 10/2000 | G06F 3/011 |
| WO | WO-2011057634 | A1 | * | 5/2011 | A61H 1/0266 |

OTHER PUBLICATIONS https://www.hpcosmos.com/en/products/sports-fitness/gait-and-motion-analysis-professional (Year: 2022).*

H/p/cosmos: Gait and motion analysis "professional", Dec. 5, 2020 (Year: 2020).*

Davis, Mike, Application: Gait improvement thru optimized Gastrocnemiuis flexibility, Summary, Jan. 17, 2023, p. 1-6.

* cited by examiner

METHOD AND SYSTEM FOR ASSESSING LEG MUSCLE CONDITION

This application claims the benefit of U.S. Provisional Application Ser. No. 63/441,072, filed Jan. 25, 2023, the contents of which are hereby incorporated by reference.

BACKGROUND

Field

Disclosed embodiments are generally related to a method and system for providing therapy to and assessing legs muscles. In particular, the disclosure is related to a method and system directed to assessing and providing therapy to the triceps surae.

Description of the Related Art

The triceps surae is a muscle group in the posterior compartment of the leg. It has the gastrocnemius, soleus, and plantaris muscles. The triceps surae composes the superficial flexor group of the leg, which forms the bulk on the back of the calf.

Assessing the status of the triceps surae muscle group is important in determining the existence of potential disorders that may be impacting an individual. Assessing the triceps surae muscle group can help to identify several conditions, including, Achilles tendonitis, which is an inflammation of the Achilles tendon that attaches the triceps surae muscle to the heel bone. Plantar fasciitis, an inflammation of the plantar fascia, a band of connective tissue that runs along the bottom of the foot. Calf muscle strains or tears, which can result from overuse or injury. Peripheral neuropathy, a condition in which the nerves that control the muscles are damaged, causing weakness and muscle wasting. Compartment syndrome, a condition in which increased pressure within a muscle compartment causes pain and muscle weakness. Charcot-Marie-Tooth disease, a genetic disorder that affects the peripheral nerves, leading to muscle weakness, wasting and foot deformities. In addition to the aforementioned disorders there are other various conditions and disorders which can impact a person's leg muscles.

There are several ways in which a condition with the triceps surae muscle can be determined. These methods include, palpation, wherein a healthcare provider will gently press on the muscle to check for tenderness, swelling, or masses. Range of motion (ROM) testing, wherein a healthcare provider will ask the patient to perform ankle dorsiflexion and plantar flexion movements to check for flexibility and muscle strength. Gait analysis, wherein a healthcare provider will observe a patient walking or running to check for abnormalities in the patient's gait, such as limping or a tendency to roll the foot inward or outward. Manual muscle testing, wherein a provider will measure muscle strength by asking a patient to perform specific exercises, such as calf raises or heel walks. Imaging tests, such as X-ray, magnetic resonance imaging (MRI), or ultrasound can be used to check for structural abnormalities or injuries to the muscle, such as tears or inflammation. Nerve conduction studies and electromyography can be used to assess nerve and muscle function respectively, in case of peripheral neuropathy or other neurological conditions.

To date there is not a device that can easily assess status of leg muscles, such as the triceps surae muscle, and then use those assessments to help determine the improvement and functioning of the triceps surae muscle. Furthermore, there is not a device that can provide assessment of the leg muscles while providing therapy to improve the condition and function of the leg muscles.

SUMMARY

Briefly described, aspects of the present disclosure relate to systems and methods for determining measurements related to leg muscles and further providing therapy to improve conditions of the leg muscles.

An aspect of the present disclosure may be a stretching device for use with triceps surae muscles. The stretching device having a frontal portion, a stand portion movably connected to the front portion, wherein the stand portion is movable between at least two positions; at least two distance sensors operably connected to the stand portion, wherein the at least two distance sensors are adapted to determine measurements between heels of feet and a surface of the stand portion; and a data transmission device adapted to transmit determined measurements to a processing device, wherein the processing device is adapted to process measurements to determine information about triceps surae muscles.

Another aspect of the present disclosure is a method for determining a condition of a leg muscle. The method comprising processing measurements received from a stretching device, wherein the stretching device comprises; a frontal portion; a stand portion movably connected to the front portion, wherein the stand portion is movable between at least two positions; at least two distance sensors operably connected to the stand portion, wherein the at least two distance sensors are adapted to determine measurements between heels of feet and a surface of the stand portion; and a data transmission device adapted to transmit determined measurements to a processing device; and determining information about the leg muscle using received measurements from the data transmission device.

DETAILED DESCRIPTION

To facilitate an understanding of embodiments, principles, and features of the present disclosure, they are disclosed hereinafter with reference to implementation in illustrative embodiments. Embodiments of the present disclosure, however, are not limited to use in the described systems or methods and may be utilized in other systems and methods as will be understood by those skilled in the art.

The components described hereinafter as making up the various embodiments are intended to be illustrative and not restrictive. Many suitable components that would perform the same or a similar function as the components described herein are intended to be embraced within the scope of embodiments of the present disclosure.

Figure 1:
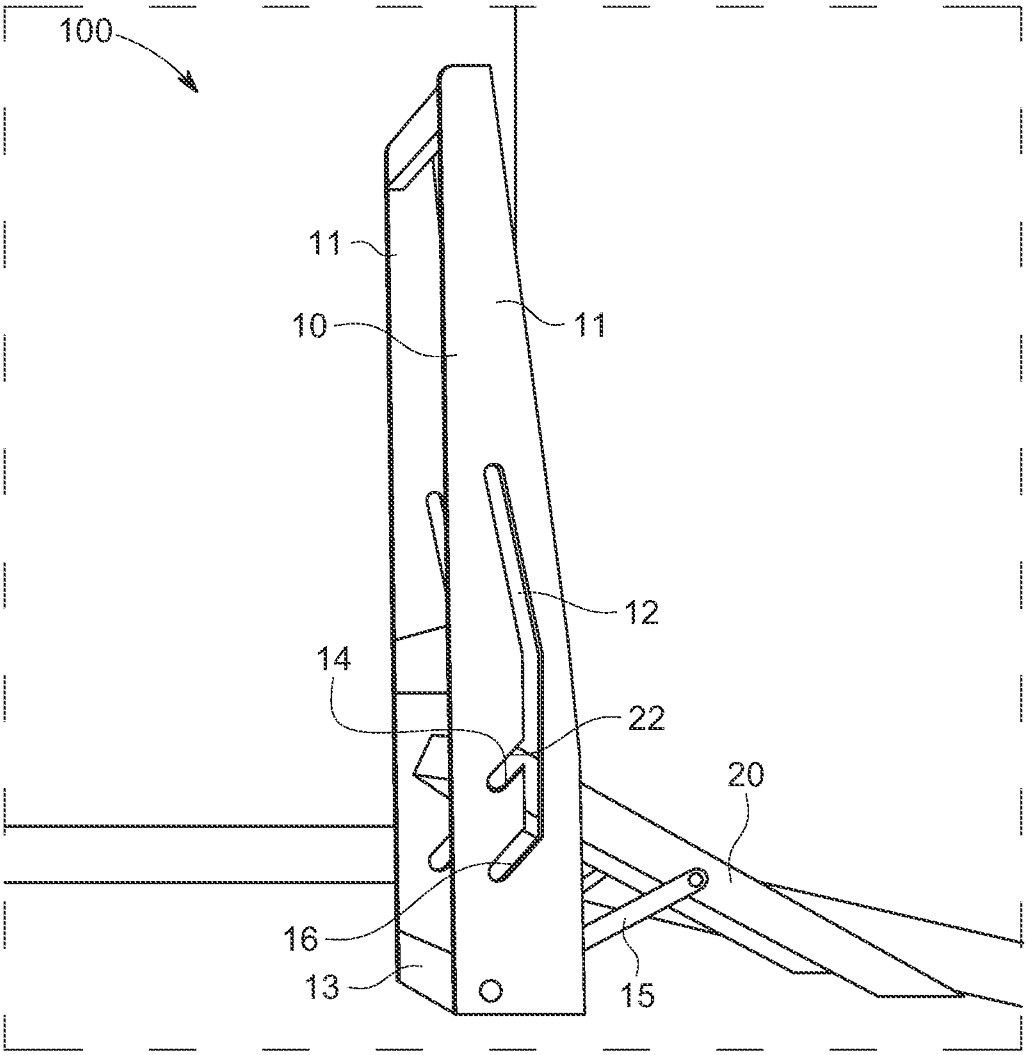
FIG. 1 shows a side view of a stretching device.

Turning to the figures, wherein like numerals refer to similar components throughout the drawings and specification. Shown in FIG. 1 is a side view of a stretching device 100. The stretching device 100 is adapted to both stretch and measure leg muscles when in use. In particular, the stretching device 100 is adapted to measure the triceps surae muscle group.

In an embodiment, the stretching device 100 comprises a frontal portion 10 and a stand portion 20. In an embodiment, the stretching device 100 is made of plastic material. In an embodiment, the stretching device 100 is made of metal material. In an embodiment, the stretching device 100 is made of ceramic material. In an embodiment, the stretching device 100 is made of wood material. In an embodiment, the stretching device 100 is made of carbon fiber. In an embodiment, the stretching device 100 is made from a combination of materials, such as metal, wood, ceramic, and plastic.

The frontal portion 10 and the stand portion 20 are adapted to be movable with respect to each other. In an embodiment, the stand portion 20 is adapted to be foldable and placed within the frontal portion 10 to enable storage and easy transportation of the stretching device 100.

The frontal portion 10 has a generally rectangular shape and is designed to be able to stand upright with respect to a floor. The frontal portion 10 stands upright by using the stand portion 20 to help stabilize the frontal portion 10. In an embodiment, the stand portion 20 is sized to fit within the frontal portion 10 when being stored or transported.

The frontal portion 10 has two sides 11 and base 13. The base 13 is adapted to be placed on a floor, or other surface area that accommodate the therapeutic procedure. The two sides 11 of the frontal portion 10 have each formed therein an elongated slot 12.

The elongated slot 12 is sized to receive a securing mechanism 22 that is connected to the stand portion 20. The securing mechanism 22 moves within the elongated slot 12. The elongated slot 12 has retention slots 14 and 16 that receive the securing mechanism 22. The retention slots 14 and 16 are located so that the stand portion 20 may be angled at specific angles with respect to a floor when in use.

Additionally connecting the frontal portion 10 and the stand portion 20 is hinged member 15. Hinged member 15 enables the stand portion 20 to move with respect to the frontal portion 10. While FIG. 1 shows the frontal portion 10 and the stand portion 20 being hingedly attached, other methods for connecting the frontal portion 10 to the stand portion 20 can be implemented, for example, pneumatic mechanisms, or slidable mechanisms can be used to move the stand portion 20 with respect to the frontal portion 10.

Figure 2:
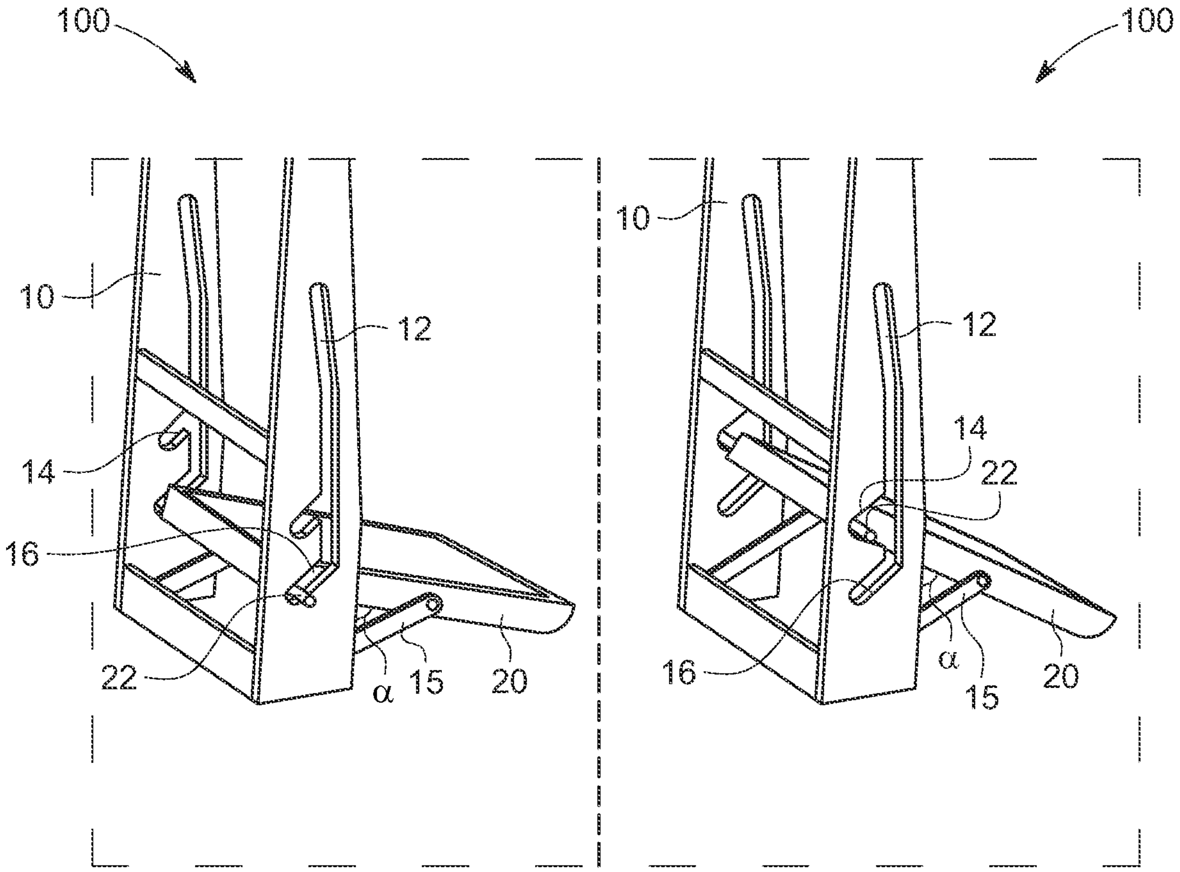
FIG. 2 shows a view of the stretching device shown in FIG. 1, placed into two different positions.

FIG. 2 shows the stretching device 100 in two different positions. The positions that the stretching device 100 are placed in are selected to provide therapeutic effects for a user of the stretching device 100. The angle of the stand portion 20 with respect to the floor enables the stretching device 100 to be position so that the leg muscles of a patient receive therapeutic treatment.

In position 1, the stretching device 100 has the stand portion 20 form an angle α with respect to the frontal portion 10. The angle α is the angle formed between the stand portion 20 and the frontal portion 10 that is located proximate to the hinged member 15. In position 1 angle α is substantially 70°. This angle α creates a 20° angle between the stand portion 20 and the floor when in use. In position 2 angle α is substantially 60°. This creates a 30° angle between the stand portion 20 and the floor when in use.

In an embodiment, there are additional angles at which the stretching device 100 can be set. In an embodiment, the angles can be set to position the stand portion 20 at an angle between 5° to 85°. In an embodiment, the angles can be set to position the stand portion 20 at an angle with respect to the floor at 15°, 20°, 25°, and 30° (having an alpha angle of 75°, 70°, 65°, and 60°, respectively). In an embodiment, the stretching device 100 has a continuously adjustable stand portion 20 that can be adjusted electronically to be at a certain angle. In an embodiment, the stretching device 100 is adapted to be set at a predetermined angle that is established to be therapeutically effective for a particular patient. In an embodiment, the stretching device 100 is adapted to take measurements to determine the effectiveness of treatment and then adjusts the angle based upon the determination of an effective treatment course.

Figure 3:
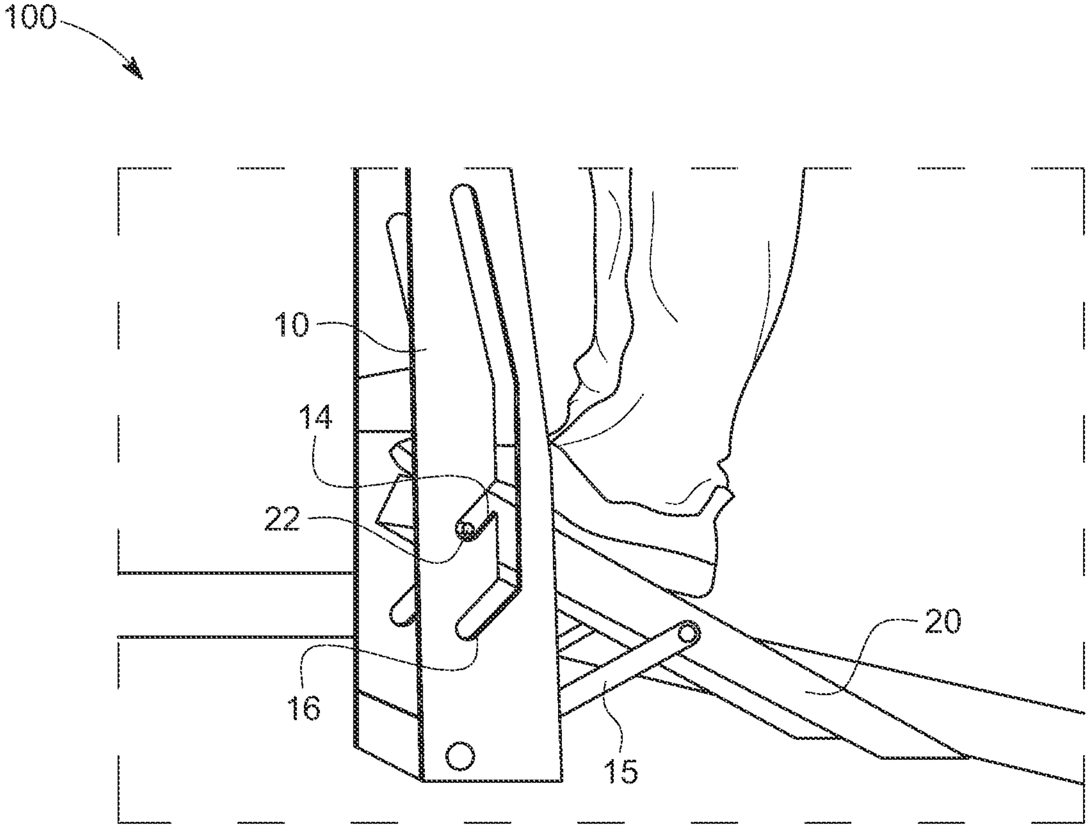
FIG. 3 shows a view of a person standing on the stretching device shown in FIG. 1.

FIG. 3 shows a view of a person standing on the stretching device 100 shown in FIG. 1. The person standing on the stretching device 100 is positioned to provide therapy to leg muscles by placing the heel of the foot against a surface of the stand portion 20 while the person's knees are fully extended.

Figure 4:
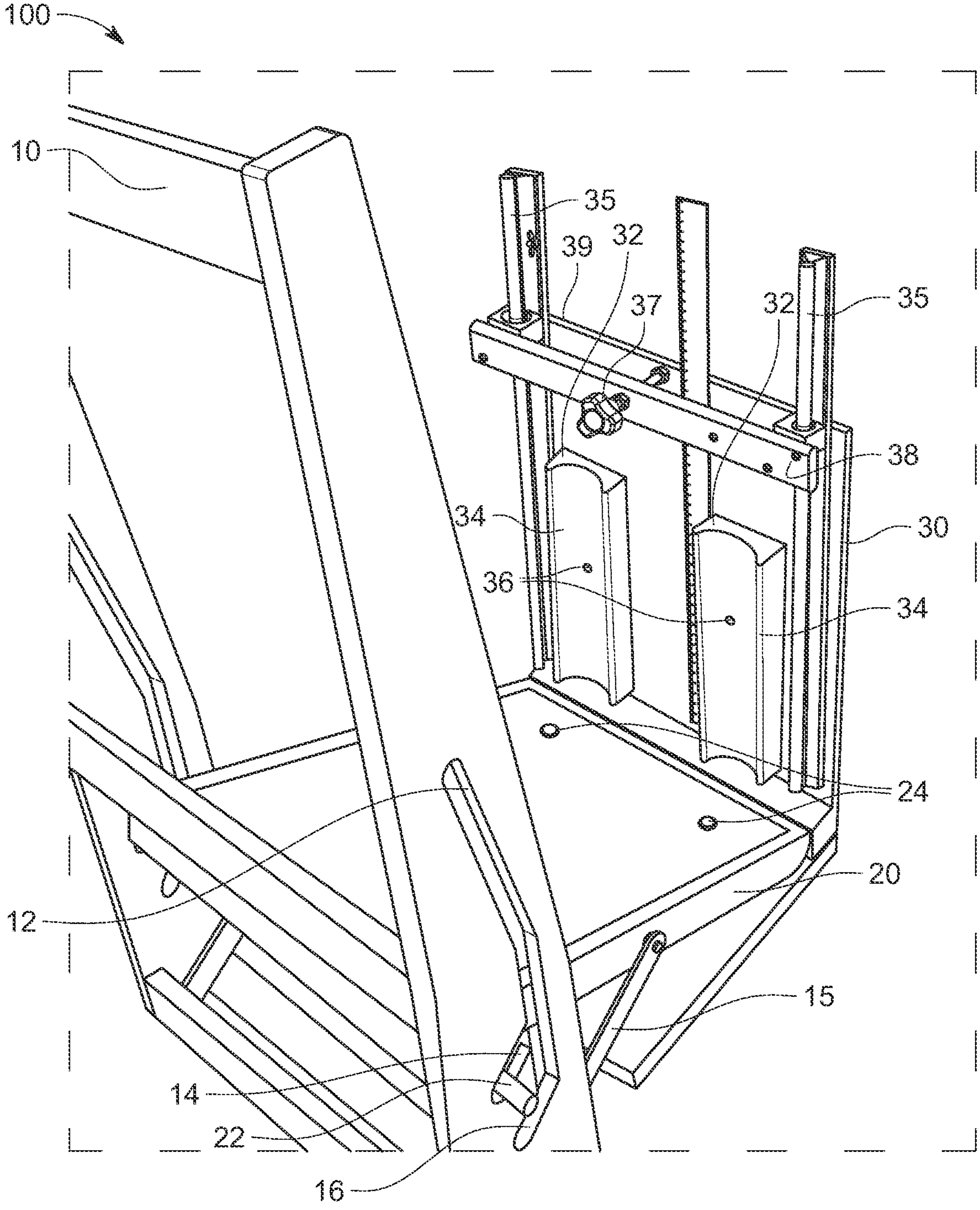
FIG. 4 shows view of a standing device that implements an orientation portion.
Figure 5:
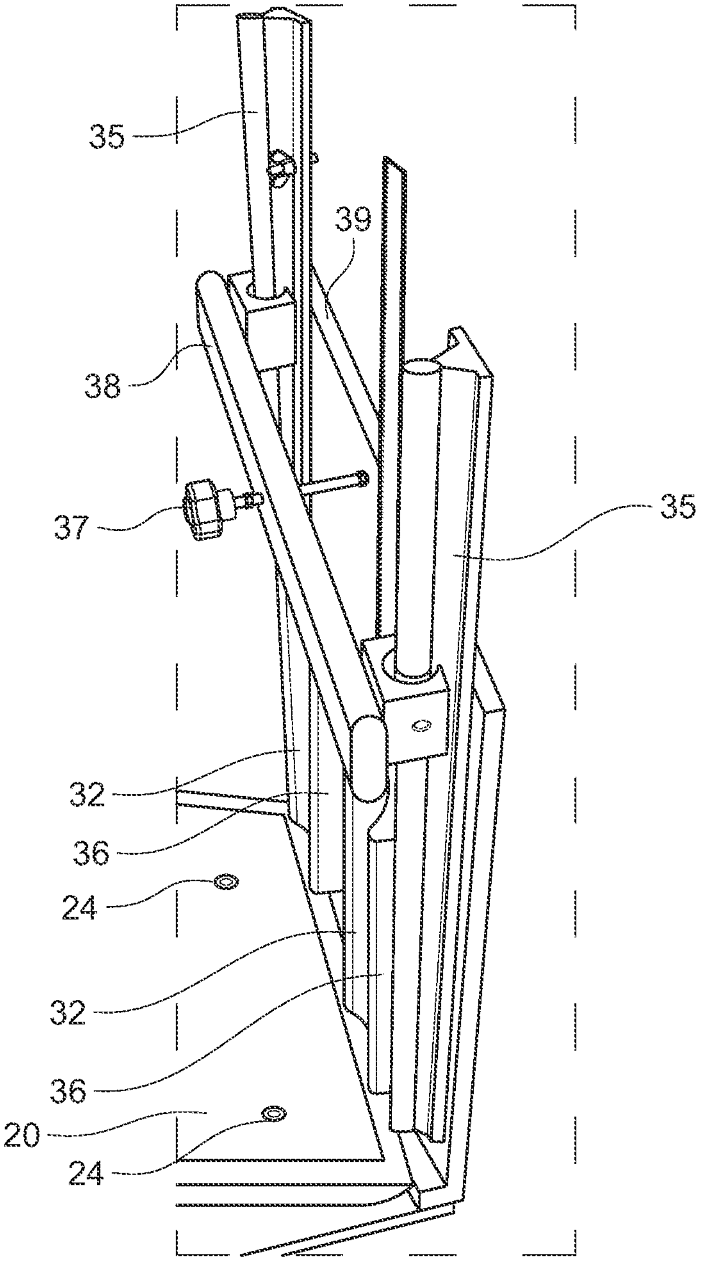
FIG. 5 is a side view of the orientation portion.
Figure 6:
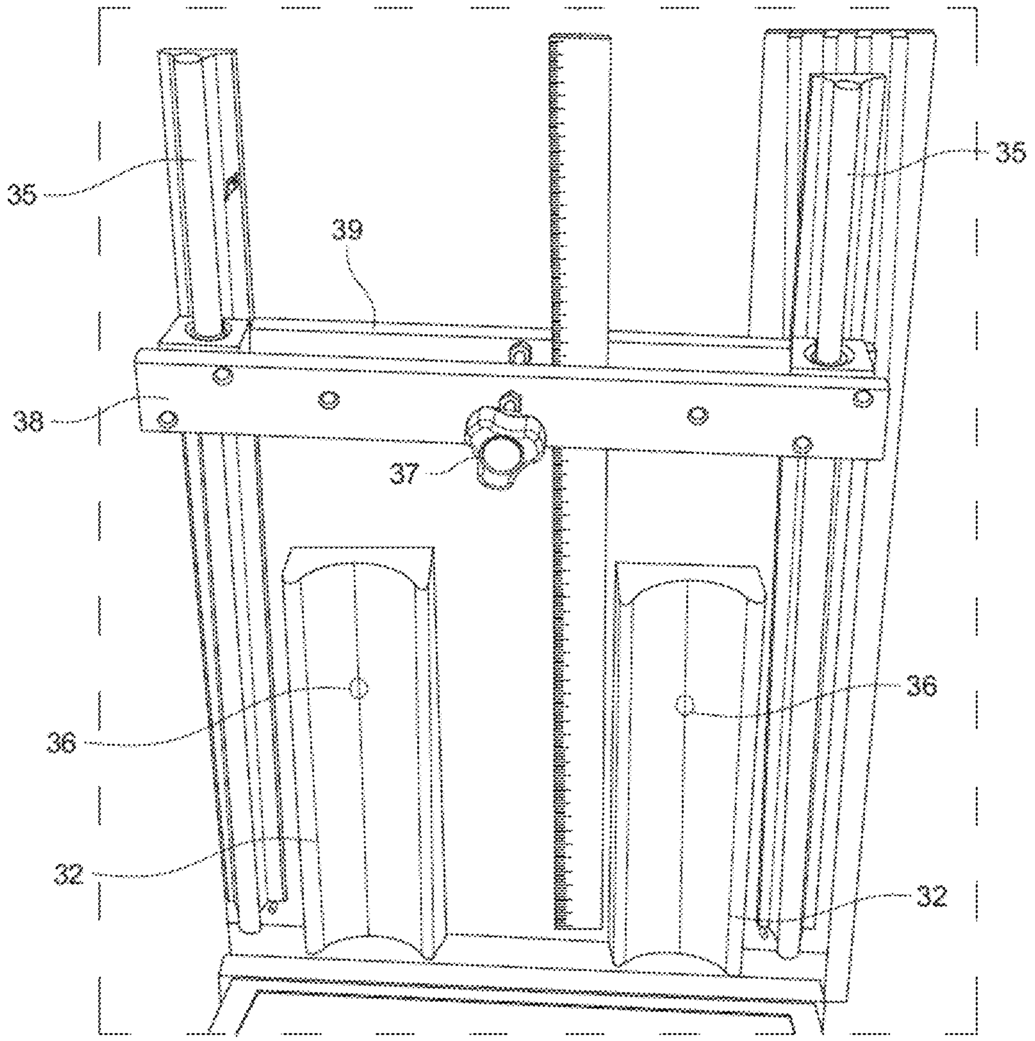
FIG. 6 is a frontal view of the orientation portion.

FIGS. 4-6 shows an embodiment of the stretching device 100 that additionally implements an orientation portion 30. The orientation portion 30 is a portion of the stretching device 100 that may optionally be utilized to further assess the movement and position of a person when using the stretching device 100.

FIG. 4 shows distance sensors 24 located on the stand portion 20. The orientation portion 30 has two leg portions 32 that have leg locators 34 that are curved. Knee distance sensors 36 are located on the leg portions 32. The two leg portions 32 are secured to back wall 39 of the orientation portion 30. In an embodiment, there are no curved leg locators 34 and the leg portions are flat.

Bar 38 is adapted to be tightened and loosened using tightening mechanism 37. The tightening mechanism 37 is adapted to move the bar 38 up and down orientation portion columns 35. This enables adjustments of the orientation portion 30 to accommodate users of different height. Utilization of the orientation portion 30 helps ensure that a user is properly located on the stretching device 100 so that proper measurements of a user can be taken. The orientation portion 30 helps to ensure that a person is situated over distance sensors 24 when using the stretching device.

In an embodiment, the distance sensors 24 and the knee distance sensors 36 are light imaging, detection, and ranging (Lidar) sensors. In an embodiment, the sensors are VL6180X sensors from STMicroelectronics that utilize proximity sensors, ambient light sensors, and a vertical cavity surface emitting laser (VCSEL). Preferably the sensors are sensors that accurately determine distances of the person with respect to various components of the stretching device 100.

The distance sensors 24 are located in the stand portion 20 and are able to determine the distance of a user's heel from the surface of the stand portion 20. The knee distance sensors 36 are able to determine the distance from the back of the knee of a user to a wall. By being able to determine the respective distances a user can determine the status and condition of the leg muscles. Typically, the indication that the distances are zero with respect to the distance of the sole of a user's foot with respect to the stand portion 20 indicates that the muscle has been fully extended. Furthermore, having a zero distance with respect to the knee distance sensor 36 indicates the knee is in a fully extended position.

In the embodiments shown there are two distance sensors 24 and two knee distance sensors 36. In an embodiment, there may be additional distance sensors 24 and additional knee distance sensors 36. Additional sensors may be used in order to take additional or supplemental measurements of the distance of various body parts to the sensors. In an embodiment, there may be multiple sensors designed to fully image the contour of the leg as it moves on the stretching device 100.

Figure 7:
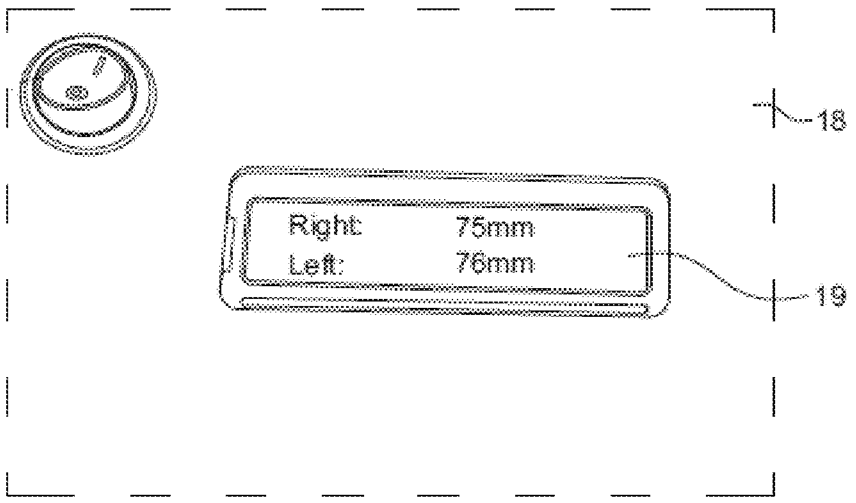
FIG. 7 is a view of a display that is used with the stretching device.

FIG. 7 is a view of a display 19 located on a top portion 18 of the frontal portion 10 that is used with the stretching device 100. The display 19 is adapted to show the distance of the right heel and the left heel of a user from the surface of the stand portion 20. Display 19 has an on off switch associated with it that can be used to activate the unit.

The display 19 showing the distance of each of the respective heels to the surface of the stand portion 20 provides biofeedback to a user of the stretching device 100. This permits the user to adjust their position and movement while using the stretching device 100. In an embodiment, measurements from knee distance sensors 36 can also be used to provide information with respect to the distance of the knee to the respective sensors.

As the gastrocnemius muscle stretches the distance between the heel and the stand portion 20 decreases. In particular, the distance from the heel of the foot to the stand portion 20 decreases. If the knee has any flexion during calf stretching, the gastrocnemius is not stretching. Preferably the knee should be fully extending during use of the stretching device 100.

Figure 8:
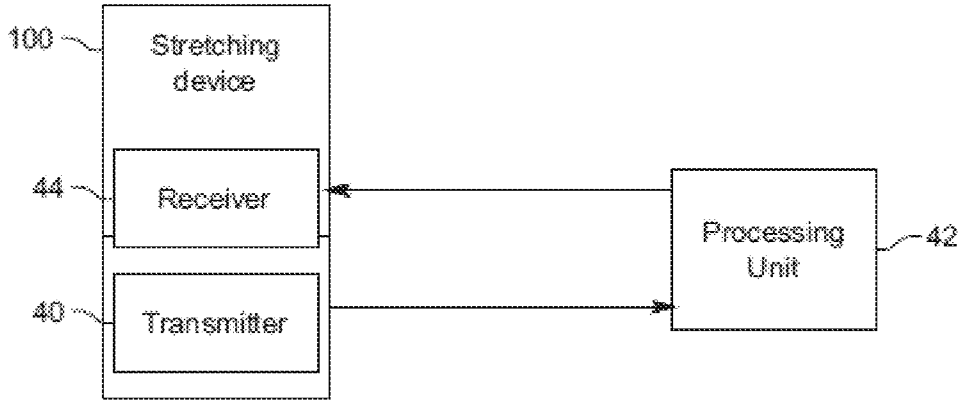
FIG. 8 shows a system diagram of the stretching device.

FIG. 8 shows a system diagram of the system used with the stretching device 100. Components discussed in the system using the stretching device 100 can be located locally or in different areas depending on the embodiment. In an embodiment, the stretching device 100 is adapted to take measurements of a person's heel with respect to the stand portion while the user is stretching his or her leg muscles. Measurements taken during the use of the stretching device 100 can be sent via a transmitter 40 from sensors to a processing unit 42. Results of the measurements can be transmitted back to the stretching device 100 and received at receiver 44, transmitted to another professional, sent back over periods of time, and/or stored for later access and analysis.

Data can be gathered from the stretching device 100 and then analyzed using deep computer learning and artificial intelligence to process large sets of data. Data can be gathered over periods of time, gathered in real time, or gathered in some predetermined manner to maximize biometric flexibility acquisition and analytics.

For example, in an embodiment, distance measurements are refreshed every second and readings are transmitted to a processing unit 42, which can be a server located in the cloud. These measurements can then be used to create a 2-minute flexibility curve which can then be transmitted to their healthcare provider via email, text, or some other means for transmission. Flexibility curves can be formed using measurements of time versus distance measurements.

In an embodiment, a 3-minute flexibility curve is created. In an embodiment, a 4-minute flexibility curve is created. In an embodiment, a 5-minute flexibility curve is created. In an embodiment, a predetermined flexibility curve is created for each session depending upon a patient's progress.

In an embodiment, multiple measurements can be taken during each second. This data can then be transmitted to a processing unit 42 to further produce the flexibility curves. In an embodiment, multiple measurements can be taken during each minute for a predetermined length of time, such as 5 minutes, 10 minutes, etc. This data can then be transmitted to a processing unit 42 to further produce flexibility curves.

Once an amount of data is obtained, this data and/or the processed data in the form of flexibility curves, improvement charts, or other information useful in determining a condition of a leg muscle can be sent to a health care provider. In an embodiment, the information can be sent on a weekly basis. In an embodiment, the information can be sent daily. In an embodiment, the information can be sent monthly. In an embodiment, the information can be sent when a threshold condition has been met, such as decreased improvement or increased improvement in condition.

The stretching device 100 can be implemented in different forms depending on the situation or environment. For example, for a physical training environment, or in a training room, a non-collapsible, aluminium stretching device can be implemented that utilizes multiple standing portion to floor angles (e.g., slopes of 15°, 20°, 35°, and 30°. In another example, for use on the side lines at sporting events, a collapsible, steel tubular device can be implemented that utilizes multiple standing portion to floor angles (e.g., slopes of 20° and 30°).

Another example is a travel unit sized to fit into a carry bag. The travel unit sized unit can be made of plastic, composite material, and/or carbon fiber. This can have a limited number of settings.

The stretching device 100 and usage of flexibility curves can be used to provide information related to the assessment and improvement of the leg muscles of the patient.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A stretching device, for use with triceps surae muscles, comprising:

a frontal portion;

a stand portion movably connected to the front portion, wherein the stand portion is movable between at least two positions;

at least two distance sensors located within the stand portion, wherein the at least two distance sensors are adapted to determine measurements from heels of feet to a surface of the stand portion;

an orientation portion operably connected to the stand portion, wherein the orientation portion comprises at least two leg portions secured to a backwall of the orientation portion;

at least one curved knee locator having a knee distance sensor adapted to determine a distance from a back of knee of a user to the knee distance sensor located on the orientation portion; and a data transmission device adapted to transmit determined measurements to a processing device, wherein the processing device is adapted to process at least two measurements from heels of feet to the surface of the stand portion and the distance from the back of knee of the user to the knee distance sensor to determine information regarding improvement of triceps surae muscles.

2. The stretching device of claim 1, wherein at least one of the at least two distance sensors is a light imaging, detection, and ranging (Lidar) sensor.

3. The stretching device of claim 1, further comprising a tightening portion that secures the knee distance sensor in position with respect to the frontal portion and the stand portion.

4. The stretching device of claim 3, wherein the knee distance sensor is adapted to transmit measurements of knee distance to the processing device, wherein determined measurements from heels of feet to the surface of the stand portion and the measurements from the knee distance sensor are used to determine if a knee is in a fully extended position.

5. The stretching device of claim 1, wherein the at least two positions for the stand portion each form an interior angle with respect to the frontal portion, wherein at least one interior angle formed is 60 degrees.

6. The stretching device of claim 1, wherein the at least two positions for the stand portion each form an interior angle with respect to the frontal portion, wherein at least one interior angle formed is 45 degrees.

7. The stretching device of claim 1, wherein the determined information regarding improvement of the tricep surae muscles is a flexibility curve.

8. The stretching device of claim 7, wherein multiple flexibility curves are used to determine the information about tricep surae muscles.

9. A system for determining a condition of a leg muscle, comprising:

a stretching device comprising;

a frontal portion;

a stand portion movably connected to the front portion, wherein the stand portion is movable between at least two positions;

an orientation portion operably connected to the stand portion, wherein the orientation portion comprises at least two leg portions secured to a backwall of the orientation portion;

at least one curved knee locator having a knee distance sensor adapted to determine a distance from a back of knee of a user to the knee distance sensor to the knee distance sensor located on the orientation portion;

at least two distance sensors located within the stand portion, wherein the at least two distance sensors are adapted to determine measurements from heels of feet to a surface of the stand portion; and a data transmission device adapted to transmit determined measurements; and a device for processing measurements, wherein the device is adapted to receive at least two determined measurements from heels of feet to the surface of the stand portion and the distance from the back of knee of the user to the knee distance sensor to determine information regarding improvement of the leg muscle using the at least two determined measurements received from the data transmission device to determine a flexibility curve based on the determined measurements over a predetermined period of time.

10. The system of claim 9, wherein at least one of the at least two distance sensors is a light imaging, detection, and ranging (Lidar) sensor.

11. The system of claim 9, wherein the leg muscle is a tricep surae muscle.

12. The system of claim 9, wherein the curved knee locator comprises a tightening portion that secures the knee distance sensor in position with respect to the frontal portion and the stand portion.

13. The system of claim 12, further comprising transmitting measurements of knee distance to the processing device, wherein determined measurements from heels of feet to the surface of the stand portion are determined and the measurements from the knee distance sensor and the measurements from heels of feet to the surface of the stand portion are is used to determine if a knee is in a fully extended position.

14. The system of claim 9, wherein the at least two positions for the stand portion each form an interior angle with respect to the frontal portion, wherein at least one interior angle formed is 60 degrees.

15. The system of claim 9, using a plurality of flexibility curves to determine the information about leg muscles.

* * * * *